US010746107B2

(12) United States Patent
Habermann et al.

(10) Patent No.: US 10,746,107 B2
(45) Date of Patent: Aug. 18, 2020

(54) VARIABLE COMPRESSION RATIO RECIPROCATING PISTON ENGINE

(71) Applicant: FEV Europe GmbH, Aachen (DE)

(72) Inventors: Knut Habermann, Herzogenrath (DE); Uwe Schaffrath, Herzogenrath (DE); Simon Gottorf, Aachen (DE)

(73) Assignee: FEV Europe GmbH, Aachen (DE)

( * ) Notice: Subject to any disclaimer, the term of this patent is extended or adjusted under 35 U.S.C. 154(b) by 36 days.

(21) Appl. No.: 16/158,533

(22) Filed: Oct. 12, 2018

(65) Prior Publication Data
US 2019/0112990 A1 Apr. 18, 2019

(30) Foreign Application Priority Data
Oct. 12, 2017 (DE) .................. 10 2017 123 726

(51) Int. Cl.
*F02D 15/02* (2006.01)
*F02B 75/04* (2006.01)
*F16C 7/06* (2006.01)
*F16C 23/10* (2006.01)
*F16C 9/04* (2006.01)

(52) U.S. Cl.
CPC .............. *F02D 15/02* (2013.01); *F02B 75/04* (2013.01); *F02B 75/045* (2013.01); *F16C 7/06* (2013.01); *F16C 9/04* (2013.01); *F16C 23/10* (2013.01); *F16C 2360/22* (2013.01)

(58) Field of Classification Search
CPC .......... F02D 15/02; F02D 15/00; F02B 75/04; F02B 75/045; F02B 75/047; F02B 75/048; F16C 7/06; F16C 9/04; F16C 23/10
See application file for complete search history.

(56) References Cited

U.S. PATENT DOCUMENTS

| 2015/0260109 A1* | 9/2015 | Wittek | F02B 75/045 |
| | | | 123/48 B |
| 2018/0016995 A1* | 1/2018 | Sugihira | F02D 41/3017 |

FOREIGN PATENT DOCUMENTS

| DE | 3148193 A1 | 6/1983 |
| DE | 19703948 C1 | 6/1998 |
| DE | 10304686 A1 | 8/2004 |
| DE | 102010061360 A1 | 6/2012 |
| DE | 102010061363 A1 | 6/2012 |
| DE | 102011108790 A1 | 1/2013 |
| DE | 102011056298 A1 | 6/2013 |
| EP | 1424486 A1 | 6/2004 |
| EP | 1426584 B1 | 10/2005 |
| WO | 2014019684 A1 | 2/2014 |
| WO | 2015082722 A2 | 6/2015 |
| WO | 2015104253 A1 | 7/2015 |
| WO | 2015155167 A2 | 10/2015 |
| WO | 2015173411 A1 | 11/2015 |
| WO | 2015173412 A1 | 11/2015 |
| WO | 2015193437 A1 | 12/2015 |

* cited by examiner

*Primary Examiner* — Jacob M Amick
(74) *Attorney, Agent, or Firm* — Dinsmore & Shohl LLP; Thomas Anderson; Jeremy J. Justice

(57) ABSTRACT

Reciprocating-piston machine (10), in particular a combustion machine, with a variable compression ratio, having an adjustment device for adjusting the compression ratio, having a sensor device for detecting the compression ratio, and having a controller which is designed to repeatedly activate the adjustment device if a deviation and a detected compression ratio and a setpoint compression ratio exists.

14 Claims, 2 Drawing Sheets

VARIABLE COMPRESSION RATIO RECIPROCATING PISTON ENGINE

CROSS-REFERENCE TO RELATED APPLICATIONS

This application claims priority of German Patent Application No. DE102017123726.7 filed Oct. 12, 2018.

FIELD OF THE INVENTION

The present invention relates to a reciprocating-piston machine, in particular a combustion machine with a "variable compression ratio" VCR, and to a method for VCR adjustment.

BACKGROUND

A compression ratio refers, in particular in the context of internal combustion engines, to the ratio of the entire cylinder space prior to the compression, that is to say the total volume, to the remaining space after the compression, that is to say the remaining volume. To realize optimum combustion or power values, it is known that the compression ratio can be varied for this purpose. Examples of such reciprocating-piston machines are described in WO 2014/019683 A1, WO 2014/019684 A1, WO 2015/173412 A1 and WO 2015/193437 A1.

In the known reciprocating-piston machines, different compression ratios are realized for example by changing the effective length of the connecting rod, for example by varying the crank radius, the connecting rod length itself, and/or the compression height. For this purpose, use is made of a generally hydraulically operated adjustment mechanism with one or more piston/cylinder support units, the working volumes of which are interconnected by means of a hydraulic circuit operated with engine oil. The hydraulic circuit includes inter alia also a switch for reversing the hydraulic flow direction from one piston/cylinder support unit to the other or from one working volume to the other. Examples of a connecting rod for a reciprocating-piston machine with variable compression ratio can be found in DE 31 48 193A1, DE 197 03 948 01, DE 103 04 686 A1, DE 10 2010 061 360A1, DE 10 2010 061 363A1, DE 10 2011 056 298A1, DE 10 2011 108 790A1, EP 1 424 486A1, EP 1 426 584 B1, WO 2014/019683 A1, WO 2015/082722 A1, WO 2015/104253 A1, WO 2015/173412 A1, WO 2015/173411 A1, WO 2015/155167 A1.

The above-described switch, incorporated into the hydraulic circuit, of the connecting rod commonly has a switchover element in the form of a bolt, which can be transferred from a first switching position, which is defined by a first stop in the connecting rod, into a second switching position (and vice versa), which is defined by a second stop in the connecting rod. In each of the two switching positions, the switchover element projects beyond a different one of the two outer sides of the connecting rod. The two switching positions correspond to different compression ratios.

The transfer of the switchover element of the switch from one switching position into the other is realized, in many embodiments in the prior art, by means of an actuating element, which has two mutually spaced-apart actuating surfaces which each extend in radial planes in relation to the crankshaft central axis. Linear movement of the actuating element parallel to the crankshaft central axis causes the switchover element, when it comes into contact with one of the actuating surfaces, to be displaced, likewise parallel to the crankshaft central axis. The actuating surfaces run in particular at an acute angle with respect to the movement plane of the switchover element in which the latter moves when the connecting rod is moved by the crankshaft.

In tests using in particular reciprocating-piston machines operated at high rotational speeds, it has been found that the transfer of the switchover element from one switching position into the other does not always take place with adequate reliability, which may be the case in particular at rotational speeds above for example 3000 rpm.

SUMMARY

It is therefore the object of the invention to create a reciprocating-piston machine, in particular in the form of a combustion machine with variable compression ratio, in the case of which the transfer of a switchover element from an (initial) switching position into one or more other (target) switching positions takes place particularly reliably.

In seeking to achieve this object, it has been found that it is scarcely possible with reasonable outlay to realize a highly reliable switchover. Rather, it has been identified that, with regard to costs and mechanical outlay, it is much easier and more effective to identify an incorrect switchover (or adjustment of the compression ratio) and then carry out a renewed switchover attempt. The object is achieved by means of the following device and the following method. The dependent claims relate to preferred refinements.

A reciprocating-piston machine, in particular a combustion machine, with a variable compression ratio comprises an adjustment device for adjusting the compression ratio, a sensor device for detecting the compression ratio, and a controller which is designed to activate the adjustment device if a deviation of a detected compression ratio from a setpoint compression ratio exists. The sensor device may be indirect, and may for example infer a set compression ratio from combustion values. The VCR device is preferably designed to have only two setpoint VCR states. This makes it easier for the sensor device to decide which VCR state is set. Errors which lead to an undesired compression ratio may lie in an incorrect position of a switchover element. Also, in the VCR device itself, friction and/or misalignments or the like may arise which counteract a desired switchover of the compression ratio. By means of a repeated activation of the adjustment device, the likelihood of the setpoint adjustment being successfully performed can be significantly increased.

In particular, the adjustment device comprises a slide, regulator or a rotary element, for which a multiplicity of setpoint positions, in particular exactly two setpoint positions, are provided. A deviation of a setpoint position and an actual position of the slide, regulator or rotary element is the cause of a deviation of a detected compression ratio from the setpoint compression ratio. It thus suffices to adjust the adjustment device in order to indirectly achieve the desired compression ratio.

It is furthermore advantageous if the adjustment device comprises a switchover element, in particular a connecting rod or a crankshaft, which is arranged on a movable part of the reciprocating-piston machine, and/or at least one actuating element is movable relative to the switchover element in order to thus vary the position of the switchover element. The movement direction may be in particular the axial direction of the crankshaft of the reciprocating-piston machine. The switching element may be in particular a slide, regulator or a rotary element.

It is furthermore advantageous if an adjustment travel is provided during the switchover of the switchover element, and positive guidance is provided for a first part of an adjustment travel. Additionally, an impetus imparted to the switchover element during the first part may be the cause of a second part of the adjustment travel.

In particular, an adjustment travel may be provided during the switchover of the switchover element, and an actuating element may be configured to effect the switchover of the switchover element, wherein an actuation travel is provided for the actuating element, and the adjustment travel amounts to at least 40% of the activation travel and is in particular greater than half of the activation travel. Alternatively and/or in addition, an adjustment travel may be provided during the switchover of the switchover element, and an actuating element may be configured to effect the switchover of the switchover element, wherein an actuation travel is provided for the actuating element. Then, the adjustment travel is less than two times the activation travel. It is ensured in this way that an adequately large spacing of the switchover element and the actuating element exists.

It is advantageous if a sensor is configured to measure the compression ratio. This measurement may be performed by means of a position sensor, which for example measures at least one end position of the piston. In this way, the compression ratio can be determined exactly. Alternatively, the sensor may output at least one reference value which allows a deviation of a setpoint position and an actual position of the slide to be inferred. It has been found that each of the preferably two possible compression ratios generates specific conditions of the combustion and/or of the torque at the crankshaft. If one or more of these values is measured and possibly additionally compared with further combustion parameters, such as for example the fuel supply, then a result value can be obtained which allows a good inference to be drawn regarding the combustion ratio. The controller preferably outputs, for each cylinder, a digital yes/no value to the question of whether the setpoint compression ratio is correctly set.

Accordingly, in particular, at least one sensor may be configured to measure an exhaust-gas temperature and/or a combustion gas state, in particular an oxidation state and/or the exhaust-gas oxygen content and/or a driveshaft torque. The controller may also be configured to infer a set compression ratio on the basis of one or more sensor measurement values. The controller may look up tables for this purpose, or a formula-based logic may be predefined.

In a method for adjusting the compression ratio of a reciprocating-piston machine with a variable compression ratio, a controller, on the basis of measurement values, draws an inference regarding the set compression ratio and, in a manner dependent on this inference, initiates an activation of a switchover element.

DESCRIPTION OF THE DRAWINGS

The invention will be discussed in more detail below on the basis of exemplary embodiments and with reference to the drawings, in which, in detail:

FIGS. 1 and 2 show the relevant components of a combustion machine 10 which is designed as a reciprocating-piston combustion machine. The combustion machine 10 has a housing 12 in which there are formed multiple cylinders 14 (cylindrical cavities) in which in each case one compression piston 16 is guided so as to be movable bidirectionally. Each compression piston 16 is supported by a connecting rod 18, which in turn is mounted on a crankpin 20 of a crankshaft 22 with crankshaft central axis 24. The crankshaft 22 is itself rotatably mounted in the housing 12.

The connecting rod 18 has an adjustment mechanism 26 which operates hydraulically. The adjustment mechanism 26 serves for a variation of the effective length of the connecting rod 18, whereby the compression ratio of the combustion machine 10 can be varied. A bolt (not shown) for the mounting of the compression piston 16 is mounted eccentrically in an eccentric ring, which itself is mounted in the connecting rod 18. A variation of the angular position of the eccentric ring causes a change in the operative length of the connecting rod 18. Generally speaking, the variation of the effective length of the connecting rod 18, that is to say of the operative length, may be realized either through variation of the geometric length of the connecting rod 18 itself, through variation of the compression height, that is to say through variation of the relative position of compression piston 16 with respect to connecting rod 18, or through variation of the crank radius. All of these adjustment possibilities can be realized hydraulically, and the invention can be used for this purpose.

Figure 2:
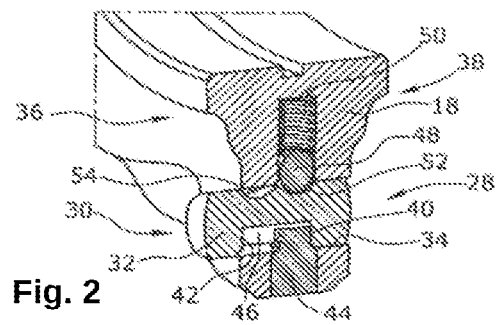
FIG. 2 shows a section through a connecting-rod bearing arrangement with a switchover element for the adjustment of the compression ratio.

Incorporated into the above-described hydraulic circuit is a switch 28 which has a switchover element 30 (switchover valve). Said switchover element 30 may preferably be designed as a bolt 32, which is arranged movably in a receiving channel 34 in the connecting rod 18. The switchover element 30 can be moved back and forth between at least two switching positions, wherein the switchover element 30, in each of these at least two switching positions, projects in relation to in each case a different one of the two sides 36, 38 of the connecting rod 18, as shown for example in FIG. 2. Two switching positions are defined in each case by a first and a second stop 40, 42, which can be realized for example by means of a stop pin 44, which, as can likewise be seen in FIG. 2, protrudes into a recess 46 of the switchover element 30. The switchover element 30 engages with detent action in both switching positions. The corresponding detent device has a spring-loaded detent ball 48, which, by means of the spring 50, protrudes into one of two detent depressions 52, 54, assigned to the two switching positions, of the switchover element 30. It is furthermore possible for further switching positions to be provided.

Figure 1:
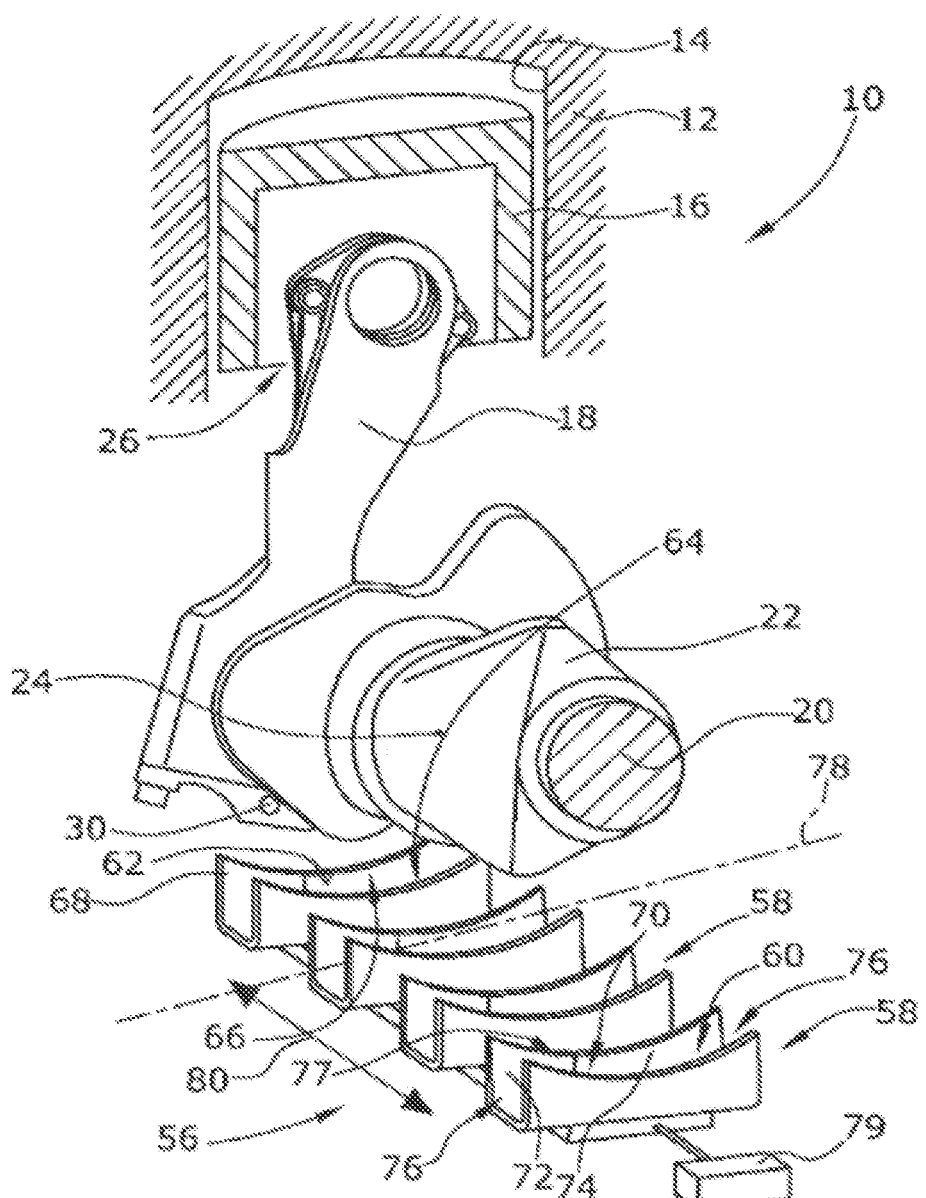
FIG. 1 shows the basic construction of a reciprocating-piston combustion machine with switchable compression ratio, wherein a connecting rod of a four-cylinder reciprocating-piston machine is shown, with a bank composed of four switchover elements assigned to the respective connecting rods being shown below the crankshaft.

Below the crankshaft 22, a bank 56 of actuating elements 58 is situated within the housing 12 of the combustion machine 10, wherein each actuating element 58 is assigned to a connecting rod 18. Each actuating element 58 has a substantially U-shaped design and forms a movement channel 60 through which that part of the connecting rod 18 in which the switchover element 30 is arranged moves during the movement of said connecting rod about the crankshaft 22. The two opposite inner sides of the movement channel 60 are formed by two opposite actuating surfaces 62, 64, which form a switching contour and which have surface sections 66, 68 running at an acute angle with respect to the movement plane of the connecting rod 18, which surface sections form a narrowing section 70 of the movement channel 60, and opposite surface sections 72, 74, which form a widening section 76 of the movement channel 60. The narrow point of the movement channel 60 is indicated at 77. The movement plane of the connecting rod 18 runs in this case perpendicular to the crankshaft central axis 24, as indicated in FIG. 1 at 78.

By means of a schematically indicated drive 79, the bank 56 of actuating elements 58 can be moved linearly back and forth, specifically in the direction of the double arrow 80 and thus parallel to the extent of the crankshaft central axis 24. Here, provision may be made whereby, instead of a common displacement of all of the actuating elements 58, said actuating elements are also movable individually. Furthermore, it is also possible, and provision is also made, for the two actuating surfaces 62, 64 of each actuating element 58 to be movable back and forth independently of one another. The connecting rod 18 with the switchover element 30 moves through between the two actuating surfaces of the actuating element 58 without making contact if no variation of the compression ratio is intended. If it is now sought to change the compression ratio, then the actuating element 58 is moved out of its rest position. The higher the ratio of crankshaft rotation to the movement speed of the actuating element, the more likely it is that the projecting end of the switchover element close to the smallest spacing of the two actuating surfaces strikes the respectively "active" actuating surface. The "active" actuating surface is in each case that actuating surface of the actuating element 58 by means of which the switchover element is moved from the presently assumed switching position into another switching position. The other actuating surface may, by contrast, be referred to as an "inactive" actuating surface.

Figure 3:
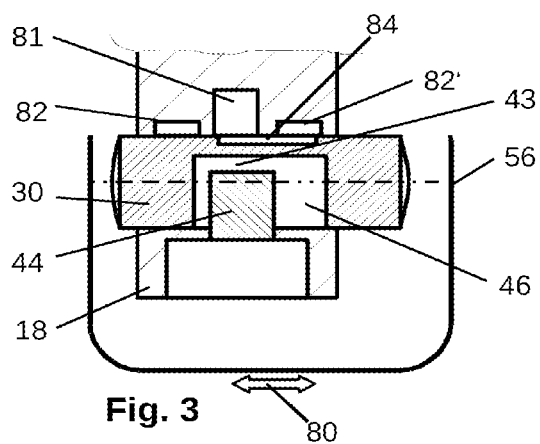
FIG. 3 shows a section through the plane of the switchover element.

For the sake of clarity, the detent device with the detent ball 48 and the spring 50 is not illustrated in the section of FIG. 3. By contrast, this figure shows the switchover element 30 which comprises an in particular radially indented recess or cavity 46, in which the stop pin 44 is received, which stop pin, generally speaking, is also regarded as a projection 44. In this way, the movement of the switchover element 30 in its longitudinal direction, preferably in both movement directions, is limited. The cross section of the recess is constant in the longitudinal direction of the switchover element 30, and the cross section of the projection or of the stop pin 44 is slightly smaller, such that a gap 43 is formed. Said gap 43 may be provided in encircling fashion, or may be provided only locally. Since the recess 46 is sealed off with respect to the interior of the housing 12 by the shape of the connecting rod 18, the fluid contained in the recess 46 must pass through the fluid channel 43 during actuation of the switchover element 30. The flow forces give rise to damping of the movement of the connecting rod 30. Furthermore, an oil supply channel 81 is illustrated, which is fluidically connected to the oil supply channel, provided in the connecting rod 18, for the lubrication of the bearing points. In the switchover element 30, there is provided a channel which is selectively connected to the supply channels 82, 82' in order to thus supply fluid to the respective pistons of the adjustment mechanism 26. Alternatively, it is also possible for the pistons of the adjustment mechanism 26 to be permanently supplied with the oil, and an outflow into the channel 81 can be made possible via the switchover element 30 with its channel 84.

If the drive 79 moves the actuating element 58 against the switchover element 30 for the purposes of varying the compression ratio, then if the engine is running at high speed, a considerable impact or shock-like load on the switchover element 30 may occur, such that said switchover element itself is moved with a very strong impetus against the stop pin 44 and can rebound from the latter. As a result, in the case of conventional known embodiments, it may possibly occur that the switchover does not take place cleanly.

Figure 4:
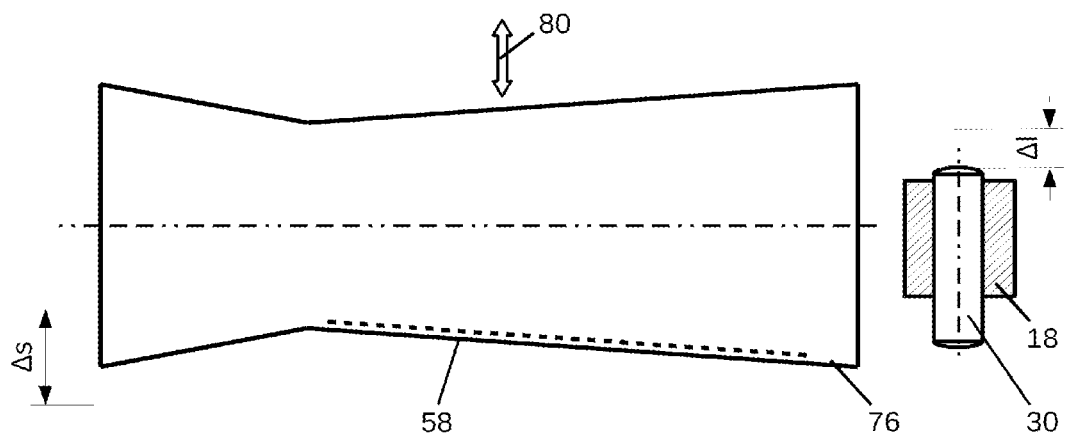
FIG. 4 shows a plan view of the actuator.

FIG. 4 shows a plan view of the actuating element 58, and, on the right, a section through the connecting rod 18 with the switchover element 30 received therein is shown. The engine direction of rotation is such that the connecting rod 18 moves to the left. The actuating element 58 is in the position such that the connecting rod 18 is to be switched over.

Correspondingly, during the described connecting rod movement, the connecting rod 18 comes into contact with a slide surface of the actuating element 58. In FIG. 4, the contact surface is shown by dashed lines. In this region, the connecting rod has positive guidance. The length of the positive guidance is shorter than the required movement travel of the connecting rod. Since the connecting rod has an impetus imparted to it in the section of the positive guidance, the connecting rod, after the end of the positive guidance, moves further in its movement direction and reaches its second end position. This movement may be assisted by means of the described detent device 48 and 50. In a preferred exemplary embodiment, the switchover element 30 may have a positively guided movement travel of 2.5 mm, and at the same time an overall switchover travel of 4.0 mm. The travel component of the positive guidance should preferably amount to at least 40% and in particular preferably at least 50% of the overall switchover travel, such that it is imperatively ensured that (if present) the ball 48 is lifted out of its cavity, shown in FIG. 2, of the switchover element 30 in positively guided fashion. An excessively large component of the positive guidance is however also disadvantageous, because then the spacing from the switchover element 30 to the actuating element 58 is relatively small, such that possible contact during normal operation cannot otherwise be reliably ruled out.

Accordingly, it has proven to be advantageous for no positive guidance to be provided over a certain travel component of the switchover element 30. However, the problem has been encountered here that the switchover element 30 may possibly not switch over or partially switch over. To identify this, a sensor may be used. This may be a position sensor which detects where, for example, the top dead centre of the piston lies. Said sensor may for example be integrated in the cylinder or cylinder head. Alternatively and/or in addition, the combustion conditions may be analysed. The compression ratio is a major influential factor for the implementation during the combustion. Accordingly, in the case of incomplete combustion, pollutants that can be detected in the exhaust gas increase. It is also then the case under some circumstances that the combustion temperature changes. Generally speaking, there may be an influence on the degree of the drive means. This can be measured by means of corresponding sensors. Alternatively and/or in addition, the oxygen content may be measured for example by means of a lambda probe, because an excessively high oxygen content in the exhaust gas allows the combustion conditions to be inferred. In conjunction with the further parameters predefined by the controller, such as for example fuel supply and fresh-air supply, it is possible to detect the setting of the compression ratio. Corresponding engine control software identifies the main parameters of the ambient conditions or load conditions of the engine and can, in conjunction with the combustion conditions, identify whether the compression ratio resulting from the position of the switchover element is set as it should be. If the engine controller detects a deviation, then the actuating element 58 can be actuated again. This may for example be performed such that said actuating element moves into a different, indeed undesired, position, and is subsequently activated again. By means of the second attempt, the likelihood of the switchover element being switched over correctly is increased. If necessary, this process may be repeated again. If the switchover has not occurred successfully even after a repeated attempt, a warning message may be triggered. In particular, the engine controller may be adapted so as to operate, in the presence of the set compression ratio, in operating conditions adapted for the same.

Figure 5:
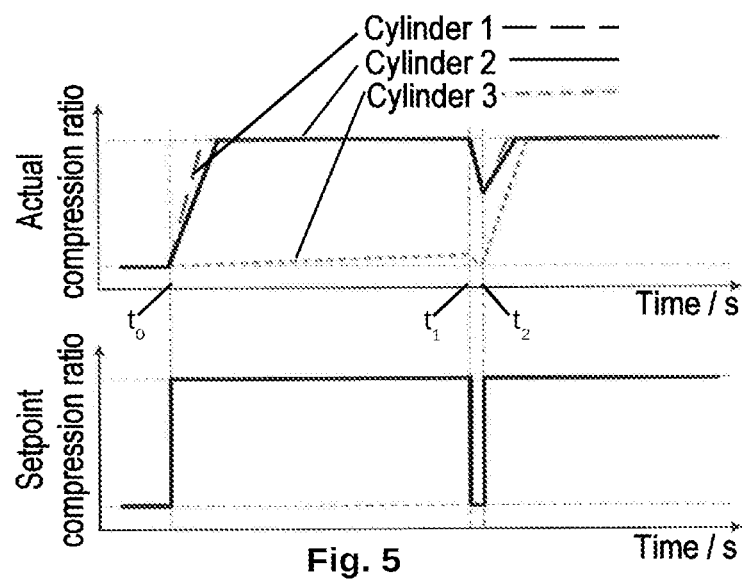
FIG. 5 shows a time diagram of the switchover based on the example of a three-cylinder combustion machine.

FIG. 5 shows a schematic diagram of the switchover based on the example of a three-cylinder engine. A time diagram of the actual compression ratio is shown in the upper part, and the setpoint compression ratio is shown in the lower part. Since the setpoint compression ratio is always set at the actuating element 58, the lower part can also be understood to represent the position of the actuating element 58. At a time $t_0$, the actuating element 58 is actuated, and the cylinders 1 and 2 consequently assume the changed actual compression ratio. This switchover has not occurred in the third cylinder for reasons that have been mentioned above. Rather, the controller identifies that the switchover has not been completely successful. This prompts the controller to actuate the actuating element 58 again at the time $t_1$. The actuation is such that the compression ratio is switched over into the original and indeed undesired state. Thus, the three cylinders each have a small impetus imparted thereto, which sets them in motion. A very short time after this activation, specifically at the time $t_2$, the controller switches the actuating element back again. This switchover causes a renewed impetus to be imparted to the three switchover elements 30. In the example shown, the actual compression ratio is changed over as desired in the third cylinder too. The time period $t_1$-$t_2$ is selected to be so short that no complete switchover of the compression ratios can occur. This is advantageous because, in this way, the undesired state of the compression ratio is kept as short as possible. It is however likewise possible, and encompassed by the concept of the invention, for a complete switchover of the compression ratios to initially take place.

The concept according to the invention described here is not restricted to an internal combustion engine with a particular number of cylinders.

The invention claimed is:

1. A reciprocating piston machine, in particular a combustion machine, with a variable compression ratio, comprising:
   an adjustment device for adjusting the compression ratio, having a sensor device for detecting the compression ratio,
   and having a controller which is designed to repeatedly activate the adjustment device if a deviation of a detected compression ratio from a setpoint compression ratio exists.

2. The reciprocating piston machine according to claim 1, wherein, for the purposes of repeating the activation of the adjustment device, the controller is designed such that the compression ratio is initially changed over into the original state and is switched back after a period of time.

3. The reciprocating piston machine according to claim 2, wherein the adjustment device comprises a slide, regulator or a rotary element, for which at least two setpoint positions are provided, and a deviation of a setpoint position and an actual position of the slide, regulator or rotary element is the cause of a deviation of a detected compression ratio from the setpoint compression ratio.

4. The reciprocating piston machine according to claim 1, characterized in that the adjustment device comprises a switchover element being either, a connecting rod or a crankshaft, which is arranged on a movable part of the reciprocating-piston machine, and at least one actuating element is movable relative to the switchover element in order to thus vary the position of the switchover element.

5. The reciprocating piston machine according to claim 4, characterized in that an adjustment travel is provided during the switchover of the switchover element, and positive guidance is provided for a first part of an adjustment travel, and an impetus imparted to the switchover element during the first part is the cause of a second part of the adjustment travel.

6. The reciprocating piston machine according to claim 4, characterized in that an adjustment travel is provided during the switchover of the switchover element, and positive guidance is provided for a first part of an adjustment travel, and, for a second part of the adjustment travel, a spring is configured to assist the switchover.

7. The reciprocating piston machine according to claim 1, characterized in that an adjustment travel is provided during the switchover of the switchover element, and an actuating element is configured to effect the switchover of the switchover element, wherein an actuation travel is provided for the actuating element, and the adjustment travel amounts to at least 40% of the activation travel.

8. The reciprocating piston machine according to claim 1, characterized in that an adjustment travel is provided during the switchover of the switchover element, and an actuating element is configured to effect the switchover of the switchover element, wherein an actuation travel is provided for the actuating element, and the adjustment travel is less than two times the activation travel.

9. The reciprocating piston machine according to claim 1, wherein a sensor is configured to measure the compression ratio or to output a reference value which allows a deviation of an actual position from a setpoint position of the slide to be inferred, and in particular, a controller is configured to draw such an inference.

10. The reciprocating piston machine according to claim 1, wherein at least one sensor is configured to measure an exhaust-gas temperature and/or a combustion gas state, in particular an oxidation state and/or the exhaust-gas oxygen content, and the controller is configured to infer a set compression ratio on the basis of one or more sensor measurement values.

11. The method for adjusting the compression ratio of a reciprocating-piston machine with a variable compression ratio, having a controller which, on the basis of measurement values, draws an inference regarding the set compression ratio and, in a manner dependent on this inference, initiates a repeated activation of a switchover element.

12. The method according to claim 11, wherein, prior to the repeated activation of the switchover element, the controller identifies whether the switchover was successful for all cylinders of the reciprocating-piston machine, and said controller initiates the repeated activation of the switchover element if this is not the case.

13. The method according to claim 11, wherein, for the purposes of repeating the activation of the switchover element, the compression ratio is changed to the original state, and is switched back after a period of time.

14. The method according to claim 13, wherein the period of time is selected such that no complete switchover of the compression ratio occurs.

* * * * *